(12) United States Patent
Zips

(10) Patent No.: US 7,620,463 B2
(45) Date of Patent: Nov. 17, 2009

(54) ARRANGEMENT FOR THE TRANSMISSION OF DATA

(75) Inventor: Alf Zips, Vanlose (DK)

(73) Assignee: Siemens Aktiengesellschaft, Munich (DE)

( * ) Notice: Subject to any disclaimer, the term of this patent is extended or adjusted under 35 U.S.C. 154(b) by 261 days.

(21) Appl. No.: 10/573,168

(22) PCT Filed: Sep. 24, 2004

(86) PCT No.: PCT/EP2004/010758

§ 371 (c)(1),
(2), (4) Date: Mar. 23, 2006

(87) PCT Pub. No.: WO2005/031477

PCT Pub. Date: Apr. 7, 2005

(65) Prior Publication Data

US 2007/0004168 A1    Jan. 4, 2007

(30) Foreign Application Priority Data

Sep. 25, 2003    (DE) ................ 103 44 575

(51) Int. Cl.
*G05B 19/18*    (2006.01)
*H04B 17/00*    (2006.01)
*H04M 1/00*    (2006.01)
*G06F 11/00*    (2006.01)

(52) U.S. Cl. .................. 700/66; 700/65; 455/67.11; 455/572; 702/188

(58) Field of Classification Search .............. 700/66, 700/65; 455/67.11, 572; 702/188
See application file for complete search history.

(56) References Cited

U.S. PATENT DOCUMENTS

| 5,434,774 | A | | 7/1995 | Seberger |
| 5,682,476 | A | * | 10/1997 | Tapperson et al. .......... 370/225 |
| 6,975,043 | B2 | * | 12/2005 | Schumacher et al. ........ 290/1 R |
| 7,002,621 | B2 | * | 2/2006 | Adair et al. ................. 348/158 |
| 7,233,745 | B2 | * | 6/2007 | Loechner .................... 398/128 |
| 2003/0091118 | A1 | | 5/2003 | Lohr |
| 2004/0106376 | A1 | | 6/2004 | Forster |
| 2005/0258950 | A1 | * | 11/2005 | Sahashi et al. .............. 340/444 |
| 2007/0243830 | A1 | * | 10/2007 | Isenmann et al. ......... 455/67.11 |

FOREIGN PATENT DOCUMENTS

| DE | 38 12 628 C1 | 4/1989 |
| DE | 4125145 A1 | 2/1993 |
| DE | 4436592 A1 | 4/1996 |
| DE | 19700110 A1 | 7/1998 |
| DE | 19701357 A1 | 7/1998 |
| DE | 19735685 A1 | 2/1999 |
| DE | 10026173 A1 | 10/2001 |
| EP | 0 788 627 B1 | 8/1997 |
| EP | 0929 948 B1 | 7/1999 |

* cited by examiner

*Primary Examiner*—Ramesh B Patel
*Assistant Examiner*—Thomas H Stevens

(57) ABSTRACT

There is described a device for the transmission of data between a portable electronic unit and a field unit, whereby a cable is provided, connected at the one end thereof to the portable electronic unit and comprises a cable coupling piece at the other end thereof, for wireless proximity connection to a corresponding field unit coupling piece, such that the data and also the operating energy for the field unit sufficient for data transmission may be transmitted by means of the wireless proximity connection.

9 Claims, 1 Drawing Sheet

ARRANGEMENT FOR THE TRANSMISSION OF DATA

CROSS REFERENCE TO RELATED APPLICATIONS

This application claims priority to the German application No. 10344575.7, filed Sep. 25, 2003, and to the International Application No. PCT/EP2004/010758, filed Sep. 24, 2004 which are incorporated by reference herein in their entirety.

FIELD OF INVENTION

The invention relates to an apparatus for transmitting data between a hand-held electronic unit and a field device.

BACKGROUND OF THE INVENTION

Field devices, e.g. for use as measuring transducers and/or final control elements in process plants, are generally known. They can be used to detect or influence process variables. To ensure than such field devices operate in the desired manner at their location, parameterization often has to be performed whereby in the case of a measuring transducer, for example, the lower and upper measuring range values are specified. If the field device is itself provided with an input keypad and a display, parameterization can be performed in a local operation, e.g. by means of mechanical keys or infrared reflection keys. As such operations are mainly performed on field devices during commissioning and rarely occur during subsequent operation, equipping the field device with an entry keypad and display involves a comparatively high cost.

SUMMARY OF INVENTION

U.S. Pat. No. 5,434,774 discloses an apparatus for the transmission of data between a hand-held terminal and a field device whereby the terminal is coupled to an existing current loop of a 4 to 20 mA interface and the data to be transmitted is frequency-modulated onto the 4 to 20 mA interface, thereby enabling the terminal to be used to parameterize the field device. Although this allows the field device to be operator-accessed locally, the disadvantage is that the process values have to be transmitted using an analog current signal during normal operation. If a field device is employed with a field bus connection of another kind, the terminal cannot be used.

EP 0 788 627 discloses a distributed control system with field devices which are connected to a hard-wired network. To obviate the need for laborious parameterization of the field devices via the network, the field devices additionally have a wireless interface by means of which a wireless connection can be established between the field device and an operator's hand-held electronic unit. The wireless connection can be implemented e.g. by a radio, optical or acoustic transmission link. The power required for operating the field device is supplied via the hard-wired network port. While this means that no extra lines in addition to the network port are required for supplying the field device with operating power, the disadvantage is that the power consumption of the field device increases due to the additional wireless interface and therefore less power is available for the actual operation of the field device, as the amount of power that can be drawn from the network is usually very limited.

EP 0 929 948 B1 describes a modular electronic control for use in a process plant whereby operating power and data are wirelessly transmitted between the individual modules.

An object of the invention is to create an apparatus for transmitting data between a hand-held electronic unit and a field device whereby the data can be transferred wirelessly and the field device's power demand on an operating power supply during data transfer is no more than slightly increased compared to its power demand during normal operation. Further objects are to create a band-held electronic unit and a field device for such an apparatus.

To achieve this object, the new apparatus of the abovementioned type has features set forth in an independent claim. Advantageous further developments are described in the dependent claims. In further independent claims a hand-held electronic unit, and a field device for such an apparatus for the transmission of data are specified.

The advantage of the invention is that it enables a hand-held terminal to be used to access a field device locally, i.e. not from a remote console, for example. No additional outlay is required, such as opening a field device enclosure or attaching connecting leads to existing communication lines via which the field device transmits its measured values to a higher-level station. As the power consumption of the field device is not unduly increased by communication with the terminal, the field device can continue to be supplied with the amount of power it normally requires for operation, e.g. via a network port which is present anyway. As the operating power input required is increased no more than slightly by data transmission between field device and hand-held electronic unit, this additional interface does not require any other lines to be provided for powering the field device.

The field device coupling piece is preferably disposed on the field device enclosure. The advantage of this is that no additional cable is required between field device coupling piece and field device and the enclosure of the field device can be of simpler construction, as the proximity connection between cable coupling piece and field device coupling piece can be implemented through a wall section of the enclosure, for example.

Advantageously a proximity connection, once set up, continues to exist without further operator effort if the cable coupling piece is detachably held to the field device coupling piece. When the cable coupling piece has been attached, it can be held automatically to the field device coupling piece by magnetic adhesion. Advantageously the operator then has his hands free for operating the hand-held electronic unit.

If the hand-held electronic unit is implemented as an operator terminal for the field device and is provided with an entry keypad and a display, this has the advantage, in combination with a field device whose electrical connection is implemented as a network port, that no keypad or display needs to provided on the field device itself to access it. For linking the field device into a control network of an industrial plant, the device's network port suffices. The instrumentation required for local operation of the field device, in particular the entry keypad and display, is therefore transferred to the terminal. The cost associated with the very occasional accessing of the field device locally relative to its service life is reduced overall.

A further reduction in the power consumption of the field device during normal operation is advantageously possible if a field device circuit required for data transmission via a proximity connection assumes, during normal operation, a standby state with lower power demand which it only leaves when the proximity connection is established and used for data transmission.

The invention can be used particularly advantageously with field devices which have to satisfy explosion protection requirements. The absence of a plug and socket connection with electrical contacts eliminates the otherwise necessary expense of implementing an intrinsically safe interface and there is no need for a cover over the field device coupling piece. Moreover, the mechanical or atmospheric stress on the contact elements of a plug and socket connection would be disadvantageous, as field devices are usually intended for use in harsh industrial environments.

BRIEF DESCRIPTION OF THE DRAWINGS

The invention and its embodiments and advantages will now be explained in greater detail with reference to the accompanying drawings illustrating an exemplary embodiment and in which.

DETAILED DESCRIPTION OF INVENTION

Figure 1:
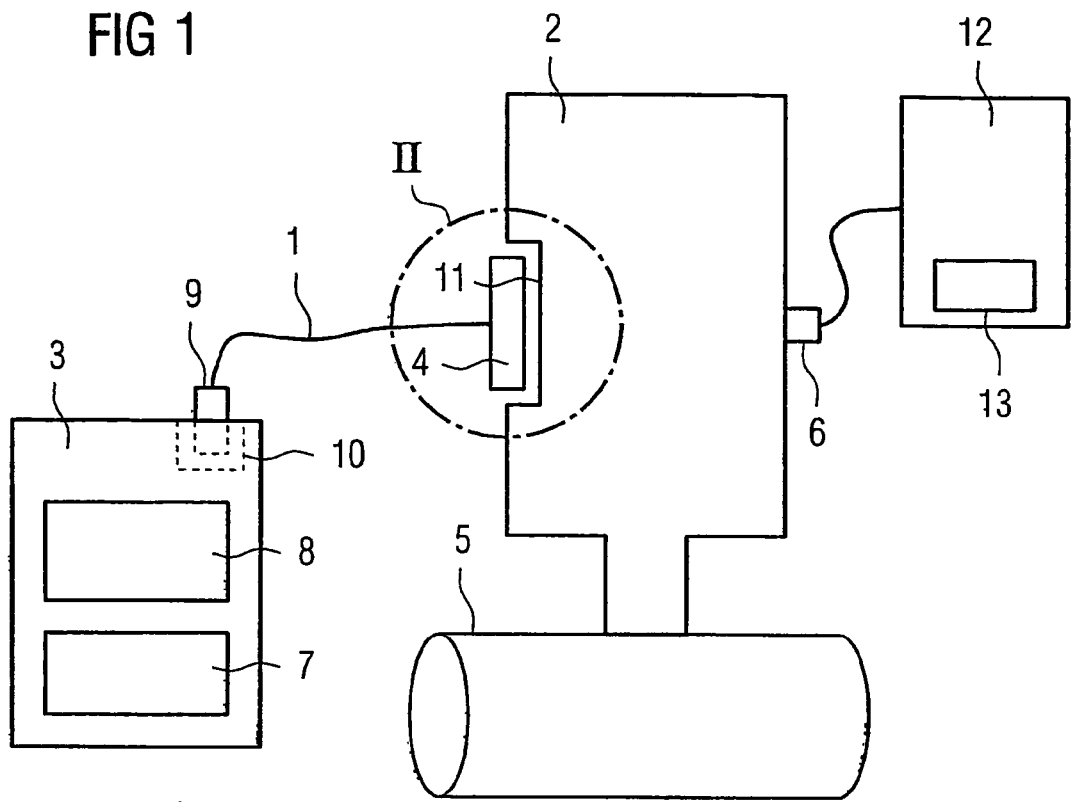
FIG. 1 shows a hand-held terminal and a field device with an apparatus for the transmission of data and FIG. 2 schematically illustrates a wireless proximity connection.
Figure 2:
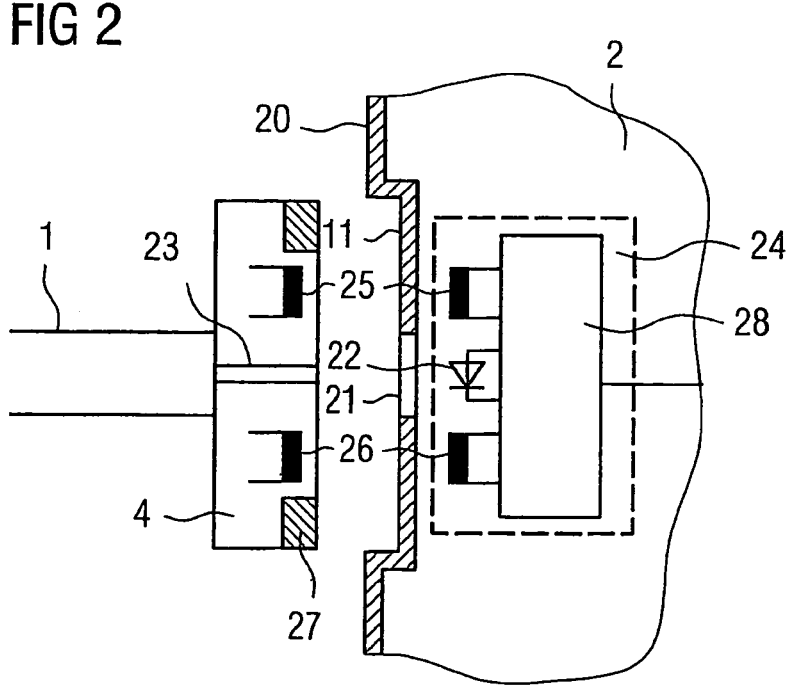

FIG. 1 shows a hand-held terminal 3 and a field device 2 which are interconnected via a cable 1 of an apparatus for transmitting data. The field device 2 is, for example, a pressure transducer mounted on a pipe run 5 of a process plant not shown in greater detail. Using a network port 6, the field device 2 is connected to a network via which it communicates with a higher-level control station 12, e.g. signals the measured pressure values to the control station 12, and via which the field device 2 is supplied with the power required for its normal operation in the process plant by an operating power supply 13 in the control station 12. If the field device 2 is to be parameterized locally, the terminal 3 is connected to the field device 2 via the apparatus for transmitting data and the operating power required by the field device 2 for data transmission. The terminal 3 has a keypad 7 and a display 8 via which an operator can make entries to and receive outputs from the field device 2. No operator equipment of this kind is any longer required on the field device 2. The apparatus for the transmission of data has a cable 1, one end of which has a connector 9 inserted in a mating receptacle 10 of the terminal, thereby establishing an electrical connection between cable 1 and terminal 3 for transmitting the power required by the field device 2 for data transmission, and also an optical connection for transmitting the data. In the terminal 3 there is provided a suitable circuit for operating the interface. The other end of the cable 1 is provided with a cable coupling piece 4 which can be connected to a corresponding field device coupling piece 11 to establish a wireless proximity connection. Via this proximity connection, data can be transmitted bidirectionally between the terminal 3 and the field device 2 and the operating power required by the field device 2 for the transmission of data can be transmitted from the terminal 3 to the field device 2. The transmission principle will now be explained in greater detail with reference to FIG. 2. In FIGS. 1 and 2 identical parts are provided with the same reference numerals.

FIG. 2 shows the basic design of a wireless proximity connection. This is established by inserting the cable coupling piece 4 into a field device coupling piece 11 implemented to accommodate it in a form-fit manner. For the sake of clarity, FIG. 2 shows the state shortly before complete insertion of the cable coupling piece 4. As the proximity connection is implemented wirelessly, no electrical contacts of any kind are required and the field device coupling piece 11 can be implemented by a section of an enclosure wall 20 of the field device 2. To accommodate the cable coupling piece 4 in a form-fit manner, the wall 20 of the enclosure is recessed in this area. In the center of this recessed section there is provided a window 21 through which optical signals of an optical transceiver 22 of the field device 2 are coupled into or out of an optical waveguide 23 of the cable coupling piece 4. The optical waveguide 23 is routed through the cable 1 alongside electrical leads which are not shown for the sake of clarity. The operating power required for supplying circuit sections 24 of the field device 2 that are involved in data transmission is transmitted by means of two inductive transformers 25 and 26, one coil of which is disposed in the cable coupling piece 4 and a second coil is disposed in the field device coupling piece 11 in each case. The circuit 24 of the field device 2 required for data transmission via the proximity connection is placed in an active state when the proximity connection is established and the required operating power is supplied via the proximity connection so that data can be transmitted. On the other hand, during times in which no wireless proximity connection is present, the circuit 24 is in a standby state in which it requires only a very small amount of operating power. This ensures that the power consumption of the field device 2 as a load on the network of a control system for the process plant is only slightly increased by the transmission of data between terminal 3 and field device 2. Other electronic circuit sections of the field device 2 to which the circuit 24 is connected, such as a microprocessor with a memory in which the transmitted parameters are stored, have not been shown for the sake of clarity. When inserted in the field device coupling section 11, the cable coupling section 4 is detachably retained by a ring magnet 27 of rotationally symmetrical design. An interface controller 28 can be implemented for communication according to any desired protocol. Preferably, however, a widely used protocol, e.g. in accordance with a PROFIBUS or HART standard, is employed.

As is clear from the exemplary design of a wireless proximity connection shown in FIG. 2, this is particularly advantageous for use in explosion-prone areas, as there is no enclosure cover or similar to be opened in order to connect the cable coupling section 4 to the field device coupling section 11. In addition, there are no fault-prone electrical contacts in the wireless proximity connection.

As an alternative to the example described, instead of optical data transmission, data can be transmitted in a physically identical manner to power transmission, e.g. using different frequency bands for data and power transmission. This has the advantage that the additional transceiver 22 and the window 21 penetrable by the optical signals can be dispensed with. As a further alternative, capacitive data and/or power transmission is possible.

The invention claimed is:

1. An arrangement for transmitting data between a hand-held electronic unit and a field device, the arrangement comprising:

a hand-held electronic unit;

a field device having at least one electrical connector for connecting the field device to an operating power supply and having a field device coupling interface, the connector configured to receive from the operating power supply an operation power for the field device sufficient for supporting all normal operations of the field device when employed in a technical facility; and a cable having first and second cable ends for establishing a data connection between the hand-held electronic unit and the field device and a power connection to supply an additional power for the data transmission, the first cable end configured to be connected to the hand-held electronic unit, and the second cable end having a cable end coupling interface for establishing a wireless proximity connection via the second cable end to the field device coupling interface such that the data is transmitted to the field device via the wireless proximity connection and the additional power for the data transmission is transmitted inductively to the field device via the wireless proximity connection, wherein the cable is held to the field device by magnetic adhesion.

2. An arrangement for transmitting data between a hand-held electronic unit and a field device, the arrangement comprising:
   a hand-held electronic unit;
   a field device having at least one electrical connector for connecting the field device to an operating power supply and having a field device coupling interface, the connector configured to receive from the operating power supply an operation power for the field device sufficient for supporting all normal operations of the field device when employed in a technical facility; and
   a cable having first and second cable ends for establishing a data connection between the hand-held electronic unit and the field device and a power connection to supply an additional power for the data transmission, the first cable end configured to be connected to the hand-held electronic unit, and the second cable end having a cable end coupling interface for establishing a wireless proximity connection via the second cable end to the field device coupling interface such that the data is transmitted to the field device via the wireless proximity connection and the additional power for the data transmission is transmitted inductively to the field device via the wireless proximity connection, wherein a wall of a enclosure of the field device is recessed in an area to accommodate the second cable end in a form-fit manner.

3. An arrangement for transmitting data between a hand-held electronic unit and a field device, the arrangement comprising:
   a hand-held electronic unit;
   a field device having at least one electrical connector for connecting the field device to an operating power supply and having a field device coupling interface, the connector configured to receive from the operating power supply an operation power for the field device sufficient for supporting all normal operations of the field device when employed in a technical facility; and
   a cable having first and second cable ends for establishing a data connection between the hand-held electronic unit and the field device and a power connection to supply an additional power for the data transmission, the first cable end configured to be connected to the hand-held electronic unit, and the second cable end having a cable end coupling interface for establishing a wireless proximity connection via the second cable end to the field device coupling interface such that the data is transmitted to the field device via the wireless proximity connection and the additional power for the data transmission is transmitted inductively to the field device via the wireless proximity connection, wherein the second cable end has a optical transceiver, and wherein the field device has a window for optical signals.

4. An arrangement for transmitting data between a hand-held electronic unit and a field device, the arrangement comprising:
   a hand-held electronic unit;
   a field device having at least one electrical connector for connecting the field device to an operating power supply and having a field device coupling interface, the connector configured to receive from the operating power supply an operation power for the field device sufficient for supporting all normal operations of the field device when employed in a technical facility; and
   a cable having first and second cable ends for establishing a data connection between the hand-held electronic unit and the field device and a power connection to supply an additional power for the data transmission, the first cable end configured to be connected to the hand-held electronic unit, and the second cable end having a cable end coupling interface for establishing a wireless proximity connection via the second cable end to the field device coupling interface such that the data is transmitted to the field device via the wireless proximity connection and the additional power for the data transmission is transmitted inductively to the field device via the wireless proximity connection, wherein the additional power required for supplying a circuit section of the field device that is involved in data transmission is transmitted via an inductive transformer.

5. The arrangement according to claim 4, wherein one coil of the transformer is disposed in the cable and a second coil is disposed in the field device.

6. An arrangement for transmitting data between a hand-held electronic unit and a field device, the arrangement comprising:
   a hand-held electronic unit;
   a field device having at least one electrical connector for connecting the field device to an operating power supply and having a field device coupling interface, the connector configured to receive from the operating power supply an operation power for the field device sufficient for supporting all normal operations of the field device when employed in a technical facility; and
   a cable having first and second cable ends for establishing a data connection between the hand-held electronic unit and the field device and a power connection to supply an additional power for the data transmission, the first cable end configured to be connected to the hand-held electronic unit, and the second cable end having a cable end coupling interface for establishing a wireless proximity connection via the second cable end to the field device coupling interface such that the data is transmitted to the field device via the wireless proximity connection and the additional power for the data transmission is transmitted inductively to the field device via the wireless proximity connection, wherein a cable coupling section for the coupling to the field device is detachably retained by a ring magnet of rotationally symmetrical design.

7. An arrangement for transmitting data between a hand-held electronic unit and a field device, the arrangement comprising:
   a hand-held electronic unit;
   a field device having at least one electrical connector for connecting the field device to an operating power supply and having a field device coupling interface, the connector configured to receive from the operating power supply an operation power for the field device sufficient for supporting all normal operations of the field device when employed in a technical facility; and
   a cable having first and second cable ends for establishing a data connection between the hand-held electronic unit and the field device and a power connection to supply an additional power for the data transmission, the first cable end configured to be connected to the hand-held electronic unit, and the second cable end having a cable end coupling interface for establishing a wireless proximity connection via the second cable end to the field device coupling interface such that the data is transmitted to the field device via the wireless proximity connection and the additional power for the data transmission is transmitted inductively to the field device via the wireless proximity connection, wherein the wireless data transmission is a capacitive data transmission.

8. An arrangement for transmitting data between a hand-held electronic unit and a field device, the arrangement comprising:

a hand-held electronic unit;

a field device having at least one electrical connector for connecting the field device to an operating power supply and having a field device coupling interface, the connector configured to receive from the operating power supply an operation power for the field device sufficient for supporting all normal operations of the field device when employed in a technical facility; and a cable having first and second cable ends for establishing a data connection between the hand-held electronic unit and the field device and a power connection to supply an additional power for the data transmission, the first cable end configured to be connected to the hand-held electronic unit, and the second cable end having a cable end coupling interface for establishing a wireless proximity connection via the second cable end to the field device coupling interface such that the data is transmitted to the field device via the wireless proximity connection and the additional power for the data transmission is transmitted capacitively to the field device via the wireless proximity connection, wherein the wireless power transmission is a capacitive power transmission.

9. An arrangement for transmitting data between a hand-held electronic unit and a field device, the arrangement comprising:

a hand-held electronic unit;

a field device having at least one electrical connector for connecting the field device to an operating power supply and having a field device coupling interface, the connector configured to receive from the operating power supply an operation power for the field device sufficient for supporting all normal operations of the field device when employed in a technical facility; and a cable having first and second cable ends for establishing a data connection between the hand-held electronic unit and the field device and a power connection to supply an additional power for the data transmission, the first cable end configured to be connected to the hand-held electronic unit, and the second cable end having a cable end coupling interface for establishing a wireless proximity connection via the second cable end to the field device coupling interface such that the data is transmitted to the field device via the wireless proximity connection and the additional power for the data transmission is transmitted inductively to the field device via the wireless proximity connection, wherein the second cable end has a optical transceiver and a coil.

* * * * *

UNITED STATES PATENT AND TRADEMARK OFFICE
CERTIFICATE OF CORRECTION

PATENT NO. : 7,620,463 B2  Page 1 of 1
APPLICATION NO. : 10/573168
DATED : November 17, 2009
INVENTOR(S) : Alf Zips It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this

Twenty-sixth Day of October, 2010

David J. Kappos
*Director of the United States Patent and Trademark Office*